United States Patent

Young et al.

[11] Patent Number: 5,848,434
[45] Date of Patent: Dec. 8, 1998

[54] METHOD AND APPARATUS FOR CACHING STATE INFORMATION WITHIN A DIRECTORY-BASED COHERENCY MEMORY SYSTEM

[75] Inventors: Gene F. Young; Roy M. Stevens, both of Lexington; Larry C. James, West Columbia, all of S.C.

[73] Assignee: Intel Corporation, Santa Clara, Calif.

[21] Appl. No.: 762,636

[22] Filed: Dec. 9, 1996

[51] Int. Cl.[6] .................................................... G06F 12/08
[52] U.S. Cl. .......................................... 711/144; 711/121
[58] Field of Search ................................... 711/143, 144, 711/121, 148, 145, 146, 118, 153, 129, 173

[56] References Cited

U.S. PATENT DOCUMENTS

| | | | |
|---|---|---|---|
| 4,394,731 | 7/1983 | Flusche et al. | 364/200 |
| 4,410,944 | 10/1983 | Kronies | 364/200 |
| 4,775,955 | 10/1988 | Liu | 364/900 |
| 4,928,225 | 5/1990 | McCarthy et al. | 364/200 |
| 5,226,144 | 7/1993 | Moriwaki et al. | 395/425 |
| 5,265,232 | 11/1993 | Gannon et al. | 711/124 |
| 5,293,602 | 3/1994 | Fukagawa et al. | 395/425 |
| 5,313,609 | 5/1994 | Baylor et al. | 395/425 |
| 5,317,716 | 5/1994 | Liu | 395/425 |
| 5,394,555 | 2/1995 | Hunter et al. | 711/122 |
| 5,398,325 | 3/1995 | Chang et al. | 395/425 |
| 5,450,563 | 9/1995 | Gregor | 395/403 |
| 5,594,887 | 1/1997 | Osaka | 711/144 |

*Primary Examiner*—Eddie P. Chan
*Assistant Examiner*—Hiep T. Nguyen
*Attorney, Agent, or Firm*—Blakely, Sokoloff, Taylor & Zafman LLP

[57] ABSTRACT

A directory-based cache coherency memory system for a multiprocessor computer system. The memory system includes a system memory shared by the multiple processors within the computer system; a plurality of data cache memories, at least one data cache memory associated with each processor; a system of busses interconnecting the system memory with the plurality of data cache memories and processors, and a state cache memory associated with the shared system memory for the storage of memory line state information identifying where within the system memory and the plurality of data cache memories the most current copy of a line of memory resides. The state cache memory is sized to store state information for only a portion of the memory lines included in system memory, e.g., one sixteenth of the memory lines contained in system memory, in recognition that rarely will all of system memory be utilized (cached) at any one time. The state cache can be a direct mapped cache wherein state information for an associated line of memory is stored within the state cache together with a tag field being a first portion of the address of the associated line of memory, and indexed within the state cache by the remaining portion of the address.

13 Claims, 4 Drawing Sheets

METHOD AND APPARATUS FOR CACHING STATE INFORMATION WITHIN A DIRECTORY-BASED COHERENCY MEMORY SYSTEM

The present invention relates to multiprocessor computer systems having multiple data cache memories and a shared memory and, more particularly, to multiprocessor computer systems employing directory-based protocols for maintaining cache coherency.

BACKGROUND OF THE INVENTION

The past several years have seen near exponential increases in the performance, speed, integration density, and capacity of computer systems. These improvements coupled with the decrease in costs for computer systems, have resulted in more expansive utilization of computer systems the development of more sophisticated and resource intensive computer applications. According to recent historical trends, application memory requirements double yearly. Although the costs for computer systems and components has steadily declined in recent years, high speed RAM memory utilized in system main memory and cache memories remains one of the highest cost components within most computer systems.

System and cache memories, used primarily for the temporary storage of data, application software and operating system software, are also being utilized within more sophisticated multiprocessor systems for the storage of parity bits, cache coherency state information, and error detection and/or correction syndrome bits. These additional memory requirements of multiprocessor systems, and the higher memory demands of advanced operating systems and applications, result in an increased demand, and cost, for high speed RAM.

More efficient methods for utilizing high speed system and cache memory, and for reducing system and cache memory requirements, are desired.

OBJECTS OF THE INVENTION

It is therefore an object of the present invention to provide a new and useful method for improving memory utilization within a computer system employing directory-based cache coherency.

It is another object of the present invention to provide such a method wherein cache state information is maintained within a dedicated cache memory thereby reducing system memory requirements.

It is yet another object of the present invention to provide a new and useful directory-based cache coherency memory system for a multiprocessor computer system.

It is still a further object of the present invention to provide a directory-based cache memory system employing a cache memory for the storage of cache state information.

SUMMARY OF THE INVENTION

There is provided, in accordance with the present invention, an improved directory-based cache coherency memory system for a multiprocessor computer system. The memory system includes a system memory shared by the multiple processors within the computer system; a plurality of data cache memories, at least one data cache memory associated with each processor; a system of busses interconnecting the system memory with the plurality of data cache memories and processors; and a state cache memory associated with the shared system memory for the storage of memory line state information identifying where within the system memory and the plurality of data cache memories the most current copy of a line of memory resides.

In the described embodiment, the state cache memory 403 is sized to store state information for one sixteenth as many memory lines as are included in system memory in recognition that rarely will all of system memory be utilized (cached) at any one time. The state cache, as described, is a direct mapped cache wherein state information for an associated line of memory is stored within the state cache together with a tag field being the first four bits of the address of the associated line of memory, and indexed within the state cache by the remaining address bits.

The above and other objects, features, and advantages of the present invention will become apparent from the following description and the attached drawings.

DETAILED DESCRIPTION OF THE PREFERRED EMBODIMENT

NCR Corporation has developed an advanced multiprocessor architecture utilizing system techniques pioneered by NCR while also advantageously making use of standard high volume (SHV) components, such as Intel Pentium Pro processors, PCI I/O chipsets, Pentium Pro chipsets, Pentium Pro bus topology (P6), and standard memory modules (SIMMs and DIMMs). Through careful integration of NCR system techniques with standard SHV components, NCR is able to deliver world class scalability and feature content while still capitalizing on SHV and without the disadvantages associated with full custom development. One implementation of this architecture is shown in FIG. 1.

System Overview

Figure 1:
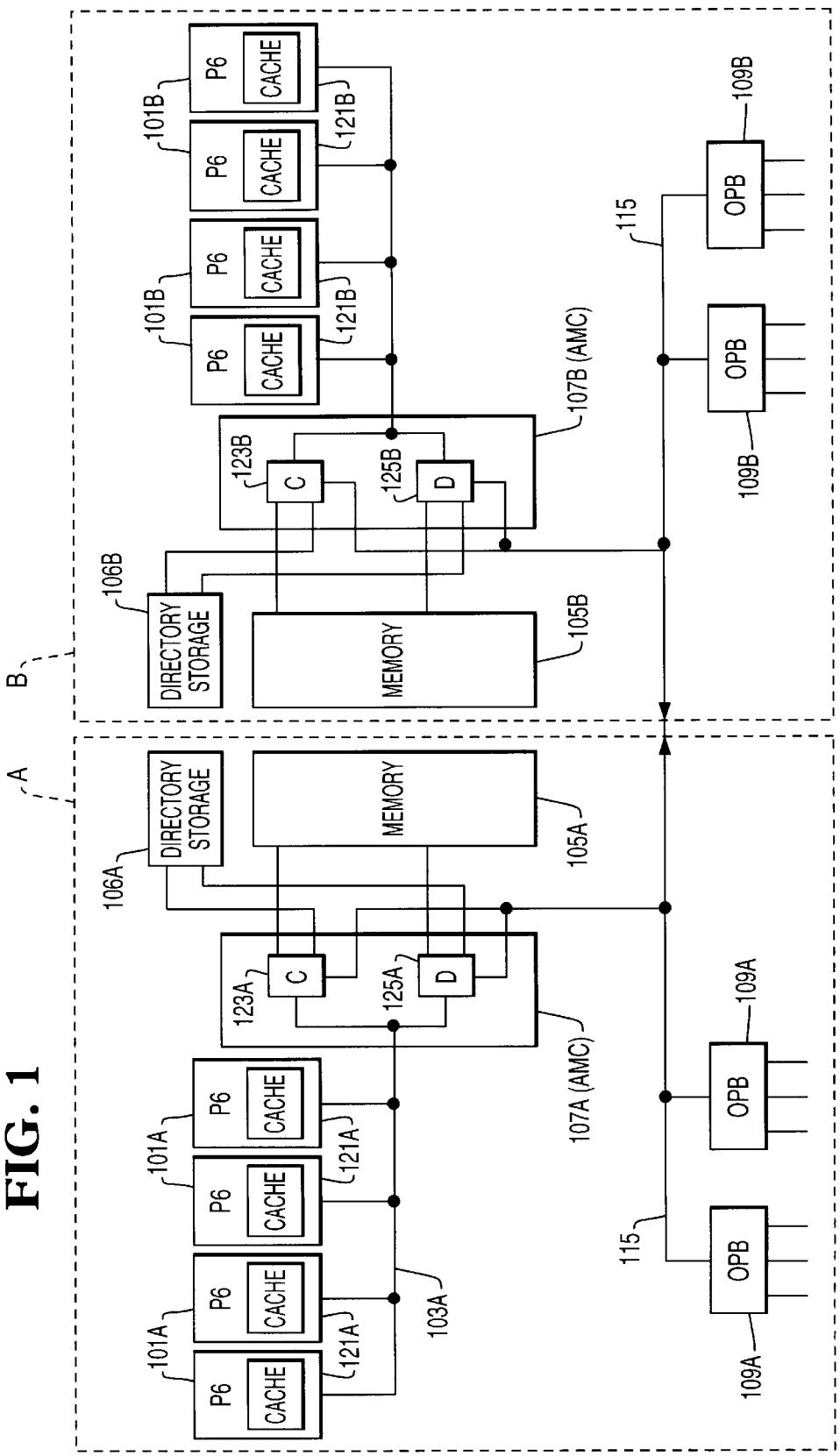
FIG. 1 is a simple block diagram representation of an eight-processor super high volume (SHV) symmetric multiprocessing (SMP) computer system employing currently available commodity components.

Referring now to FIG. 1, there is seen an eight-processor SMP system formed of two four-processor building blocks or complexes, identified by reference numerals A and B. Each complex is seen to include identical structure and components, which are identified by reference numerals ending in either an A or a B, for complex "A" and "B", respectively.

The portion of the system contained in complex A is seen to include up to four processors 101A connected to a high-bandwidth split-transaction processor bus 103A. Associated with each processor 101A is a cache memory 121A. A system memory 105A is connected to bus 103A through an advanced dual-ported memory controller 107A. The processor bus 103A is connected to the first port of memory controller 107A. The second memory controller port connects to a high bandwidth I/O bus 115, also referred to herein as an expansion bus, which provides connection for multiple PCI I/O interfaces 109A. All of these components, with the exception of advanced memory controller 107A, are currently available commodity components. For example, processors 101A may be Intel Pentium Pro processors and busses 103A and 115 may be Pentium Pro (P6) bus topology.

The advanced memory controller (AMC) 107A manages control and data flow in all directions between processor bus 103A and I/O bus 115. The I/O bus may contain P6 to PCI I/O Bridges and another AMC ASIC for connectivity to another processor bus, as will be discussed below. The AMC 107A also controls access to a coherent DRAM memory array. The AMC as presently implemented consists of a control and data slice ASIC pair.

As stated earlier, complex B has a construction identical to complex A. The two complexes are interconnected by expansion bus 115, allowing for communication between the processors 101A and 101B, system memories 105A and 105B, as well as shared I/O devices, cache memories, and other components.

Within each complex, the processors use a bus snooping protocol on the processor bus. Bus snooping is a method of keeping track of data movements between processors and memory. There are performance advantages to this system with a small number of tightly-coupled processors. If a processor needs data that is available in the data cache of another processor on the same bus, the data can be shared by both processors. Otherwise, the data must be retrieved from main memory 105A or 105B, a more time consuming operation which requires system bus traffic. This method enhances system performance by reducing system bus contention.

The characteristics of the NCR architecture shown in FIG. 1 include:

Capitalizes on industry SHV architecture and supporting commodity chips (IOB. etc.)

Dual ported memory controllers 107A and 107B permit connection and utilization of dual buses, each operating at 66 MHz with a bandwidth of 64 bits and capable of sustained data transfer rates of 533 MB/s.

Dual bus approach provides greater scalability through a reduction of bus loadings and provision of a private processor to memory path that can operate independent of IOB to IOB traffic.

Additional processors and I/O devices can be connected to the expansion bus 115.

The system as described is able to fill High Availability Transaction Processing (HATP) and Scaleable Data Warehouse (SDW) server needs, while capitalizing on the computer industry's SHV motion.

Memory-Based Coherency

The advantages offered by the use of cache memories to improve system speed, allowing processors to operate effectively at the faster speed of the cache memory rather than at the slower speed of a conventional DRAM main memory, are well known. A cache memory provides information to its associated processor faster than main memory, thus improving read cycles. Write cycles are also improved as a cache memory receives information from its associated processor at a fast rate, allowing the processor to continue processing while the cache independently processes the write to main memory as needed. The use of cache memories, such as cache memories 121A and 121B, within a multiprocessor system, however, provides additional advantages. System performance is improved through more efficient utilization of the memory or system buses. Traffic on the memory bus is reduced. Each data read and write operation need not involve main memory, rather data can be exchanged between the data cache and main memory when convenient through the execution of burst cycles.

In any system employing a data cache memory, and particularly a system employing multiple data cache memories and multiple levels of data cache memories, data from a given memory location can reside simultaneously in main memory and in one or more data cache memories. However, the data in main memory and in data cache memory may not always be the same. This may occur when a microprocessor updates the data contained in its associated data cache memory without updating the main memory and other data cache memories, or when another bus master changes data in main memory without updating its copy in the microprocessor data cache memories.

To track the data moving between the processors, system memory modules 105A and 105B, and the various data cache memories, the system utilizes a hybrid of memory and cache based coherency. Coherency between system memory and caching agents, i.e., system bus processors, is maintained via a combination centralized/distributed directory-based cache coherency.

A directory-based cache coherency scheme is a method of keeping track of data movements between the processors and memory. With this approach to data coherency, a memory status table identifies which processors have which lines of memory in their associated data cache memories. When a processor requests data, the status table identifies the location within main memory or processor data cache where the most current copy of the data resides. The advantage of this method is that no additional work must be performed until a processor needs data that resides in a cache that cannot be accessed through snooping. Directory-based cache coherency is most effective with a large number of tightly-coupled processors on a system bus.

The centralized/distributed directory-based cache coherency scheme employed in the system shown in FIG. 1 consists of two directory elements. The central element within the directory scheme resides in system memory and is called the Memory Line Status Table (MLST). Each memory line within system memory includes a corresponding entry in the MLST. This corresponding entry contains information indicating whether or not a line is cached, and if so, whether it is exclusively owned by one processor (or bus), or shared across multiple processors (or buses). The directory scheme and MLST can be set up to identify memory line ownership by system bus or by processor. The "bit-per-bus" MLST distinguishes ownership on a bus basis, while the more granular "bit-per-processor" MLST distinguishes ownership on a processor basis. Note that the distinction is specific to a memory design and hence transparent to any other device on the system bus.

Figure 2:
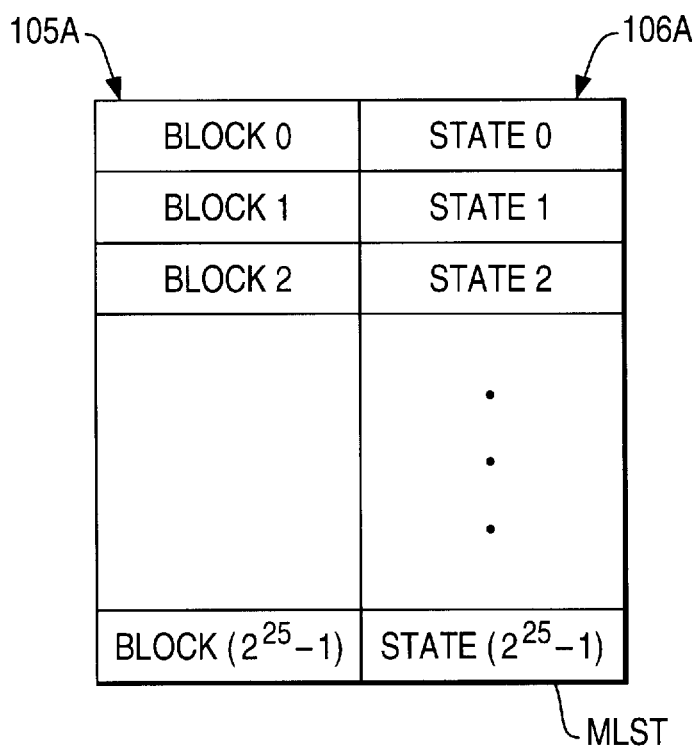
FIG. 2 is a block diagram representation of system memory 105A of FIG. 1 showing a first memory area for the storage of memory blocks and a second memory area for the storage of state information in accordance with a centralized/distributed directory based cache coherency scheme.

FIG. 2 illustrates a one gigabyte ($2^{30}$ bytes) system memory, having $2^{25}$ blocks or lines with a block or line size of 32 bytes. Each line also includes several additional bits for the storage of state information. The section of memory dedicated to the storage of state information forms the MLST.

Distributed directory elements reside locally within each processor's data cache directory. The element associated with a particular processor is referred to as its Processor Line Status Table (PLST). Each cache line has a corresponding entry in the PLST. From the local processor's perspective, this entry contains information indicating whether or not a line contains a valid copy of a main memory line, and if so, whether or not modifications to that line must be broadcast to the rest of the system. From the system's perspective, each processor's PLST is a slave to special system bus cycles known as Memory Intervention Commands (MICs). These cycles query the PLST as to the local state of a particular line, and/or tell the PLST to change that local state. The structure of each data cache memory and its associated PLST is similar to the system memory structure shown in FIG. 2.

Memory and Cache State Definitions

The PLST consists of Modified-Exclusive-Shared-Invalid (MESI) state bits in the data cache. The MESI cache coherency protocol is a hardware-implemented protocol for maintaining data consistency between main memory and data cache memories. A typical implementation of the MESI hardware cache coherency protocol requires the utilization of cache controllers having the ability to:

1. use the same line size for all caches on the memory bus;
2. observe all activity on the memory bus;
3. maintain state information for every line of cache memory; and
4. take appropriate action to maintain data consistency within the cache memories and main memory.

MESI represents four states which define whether a line is valid, if it is available in other caches, and if it has been modified. Each line of data in a cache includes an associated field which indicates whether the line of data is MODIFIED, EXCLUSIVE, SHARED, or INVALID. Within the Processor Line Status Table each cache line is marked in one of the four possible MESI states:

MODIFIED (PM)—This state indicates a line of data which is exclusively available in only this cache, and is modified. Modified data has been acted upon by a processor. A Modified line can be updated locally in the cache without acquiring the shared memory bus. If some other device in the system requires this line, the owning cache must supply the data.

EXCLUSIVE (PE)—This state indicates a line of data which is exclusively available in only this cache, that this line is not Modified (main memory also has a valid copy), and that the local processor has the freedom to modify this line without informing the system. Exclusive data can not be used by any other processor until it is acted upon in some manner. Writing to an Exclusive line causes it to change to the Modified state and can be done without informing other caches, so no memory bus activity is generated. Note that lines in the (PE) state will be marked (MO) in the MLST, as will be described below.

SHARED (PS)—This state indicates a line of data which is potentially shared with other caches (the same line may exist in one or more caches). Shared data may be shared among multiple processors and stored in multiple caches. A Shared line can be read by the local processor without a main memory access. When a processor writes to a line locally marked shared, it must broadcast the write to the system as well.

INVALID (PI)—This state indicates a line of data is not available in the cache. Invalid data in a particular cache is not to be used for future processing, except diagnostic or similar uses. A read to this line will be a "miss" (not available). A write to this line will cause a write-through cycle to the memory bus. All cache lines are reset to the (PI) state upon system initialization.

In accordance with the MESI protocol, when a processor owns a line of memory, whether modified or exclusive, any writes to the owned line of memory within main memory will result in an immediate update of the same data contained within the processor's data cache memory.

The Memory Line Status Table marks a memory line in one of three possible states: NOT CACHED (MNC), SHARED (MS), and OWNED (MO). The letter M distinguishes these states from PLST states, which are identified by use of the letter P. Additionally there are bus and/or processor state bits indicating sharing or ownership on either a bus or processor basis.

NOT CACHED (MNC): Indicates that no cache has a copy of that line.

All memory lines must be reset to the (MNC) state upon system initialization.

SHARED STATE (MS): Indicates that one or more caches potentially have a copy of that line.

OWNED STATE (MO): Indicates that one and only one cache potentially has a copy of that line, and that the data in memory potentially does not match it (Memory data is referred to as stale).

Note the word "potentially" used in the definition of the shared and owned states. There are several situations in which the MLST does not have the most up-to-date information about a particular memory line. For example, the MLST may mark a line as shared by two particular processors since it saw them both read it. However, both processors may have long since discarded that line to make room for new data without informing the MLST (referred to as "silent replacement"). The MLST will naturally "catch up" to the latest state of a particular line whenever an access to that line by some master forces a MIC. In this example, a write by a third processor to this line will initiate a (now superfluous) MIC to invalidate other cached copies, and will bring the MLST up-to-date. Note however that the MLST always holds a conservative view of the state of cache lines. That is, a line that is owned or shared by a processor will always be marked correctly in the MLST. "Stale" information in the MLST takes the form of lines marked owned or shared that are no longer present in any processor's data cache.

As stated above, the MLST includes additional bus and/or processor state bits indicating sharing or ownership on either a bus or processor basis.

The Bit-per-Bus Protocol uses three memory state bits per line to indicate the current state of the line. One bit indicates shared or owned, and the other two depict which bus (A or B) or buses (A and B) have the line shared or owned. Bus ownership indicates that one of the processors on that bus owns the line. Note that a line can be owned by only one processor and therefore by only one bus. A shared line can be shared by one or more processors on each bus.

TABLE 1

Memory State Bits for Bit-per-Bus Protocol

| OBA | STATE BIT DEFINITIONS | DESCRIPTION |
|---|---|---|
| 000 | MNC - Not Cached; | Not owned or shared |
| 001 | MS - Shared; | Shared on Bus A |
| 010 | MS - Shared; | Shared on Bus B |
| 011 | MS - Shared; | Shared on Buses A and B |
| 100 | x - (not a valid state) | |
| 101 | MO - Owned; | Owned by Bus A |
| 110 | MO - Owned; | Owned by Bus B |
| 111 | x - (not a valid state) | |

The Bit-per-Processor Protocol has an MLST consisting of n+1 bits per line (n is equal to the number of processors) to indicate the current state of that line. One bit indicates whether the line is shared (MS) or owned (MO), and the other n bits depict which processor or processors have the line cached. A particular processor is numbered Pi, where i=0 to n−1. All Pi, where i is even, are on bus A, and all Pi, where i is odd, are on bus B. Processor ownership indicates which processor (only one) owns the line. A shared line can be shared by one or more processors on either or both buses.

TABLE 2

Memory State Bits for Bit-per-Processor Protocol

| O | P0..Pn-1 | STATE BIT DEFINITIONS |
|---|---|---|
| 0 | all zeros | MNC - Not Cached |
| 0 | one or more set | MS - Shared |
| 1 | only one set | MO - Owned |
| 1 | more than one set | x - (not a valid state) |
| 1 | all zeros | x - (not a valid state) |

It is apparent from the discussion above that a directory-based coherency system, such as the centralized/distributed directory-based cache coherency scheme described, requires a significant amount of additional memory for the storage of state information; this state storage overhead being a fixed percentage of the total amount of memory available. For example, in a system having one gigabyte of system memory with a block or line size of 32 bytes, each line including four 4 bits state information, a MLST of sixteen megabytes will be required for the storage of state information.

The amount of memory required for the storage of state bits will vary depending upon the directory-based cache coherency scheme employed within the system, e.g., a conventional directory-based cache coherency scheme or a centralized/distributed directory-based cache coherency scheme utilizing either a bit-per-bus or a bit-per-processor MLST protocol. The state storage overhead is also directly related to the number of processors within a system employing a centralized/distributed directory-based cache coherency scheme utilizing a bit-per-processor MLST protocol Memory State Cache The present invention provides a method for caching state information for a memory system with directory-based coherency. The method described herein is built upon the recognition that rarely will all of system memory be utilized at any one time. State storage requirements can therefore be reduced by caching state entries for active memory lines, i.e., caching the MLST.

The method provides a cache for the state information comparable to a typical data cache which stores memory data. This structure is illustrated in FIGS. 3 and 4.

Figure 3:
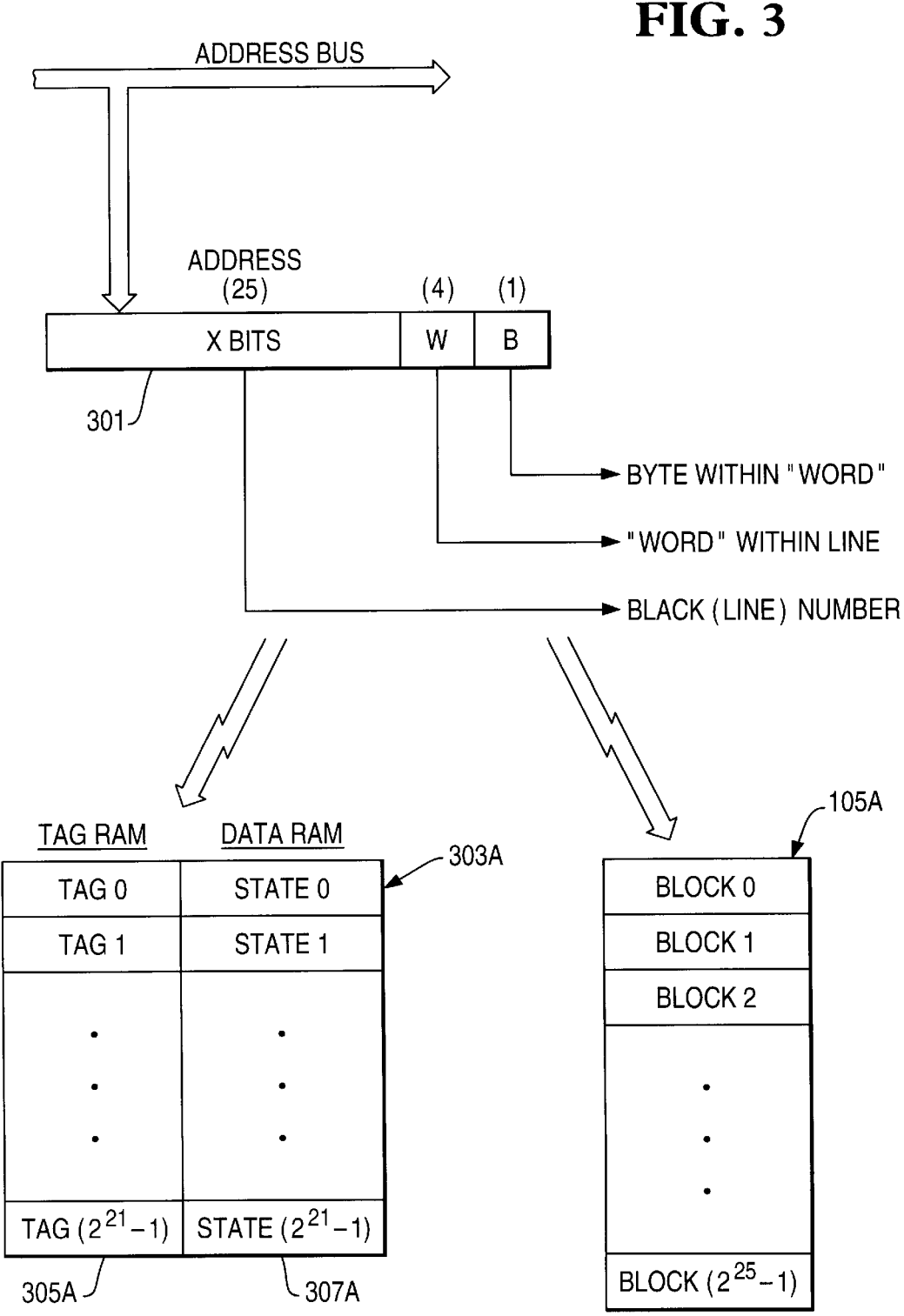
FIG. 3 is a block diagram representation of system memory 105A and a cache memory for the storage of state information in accordance with the present invention.
Figure 4:
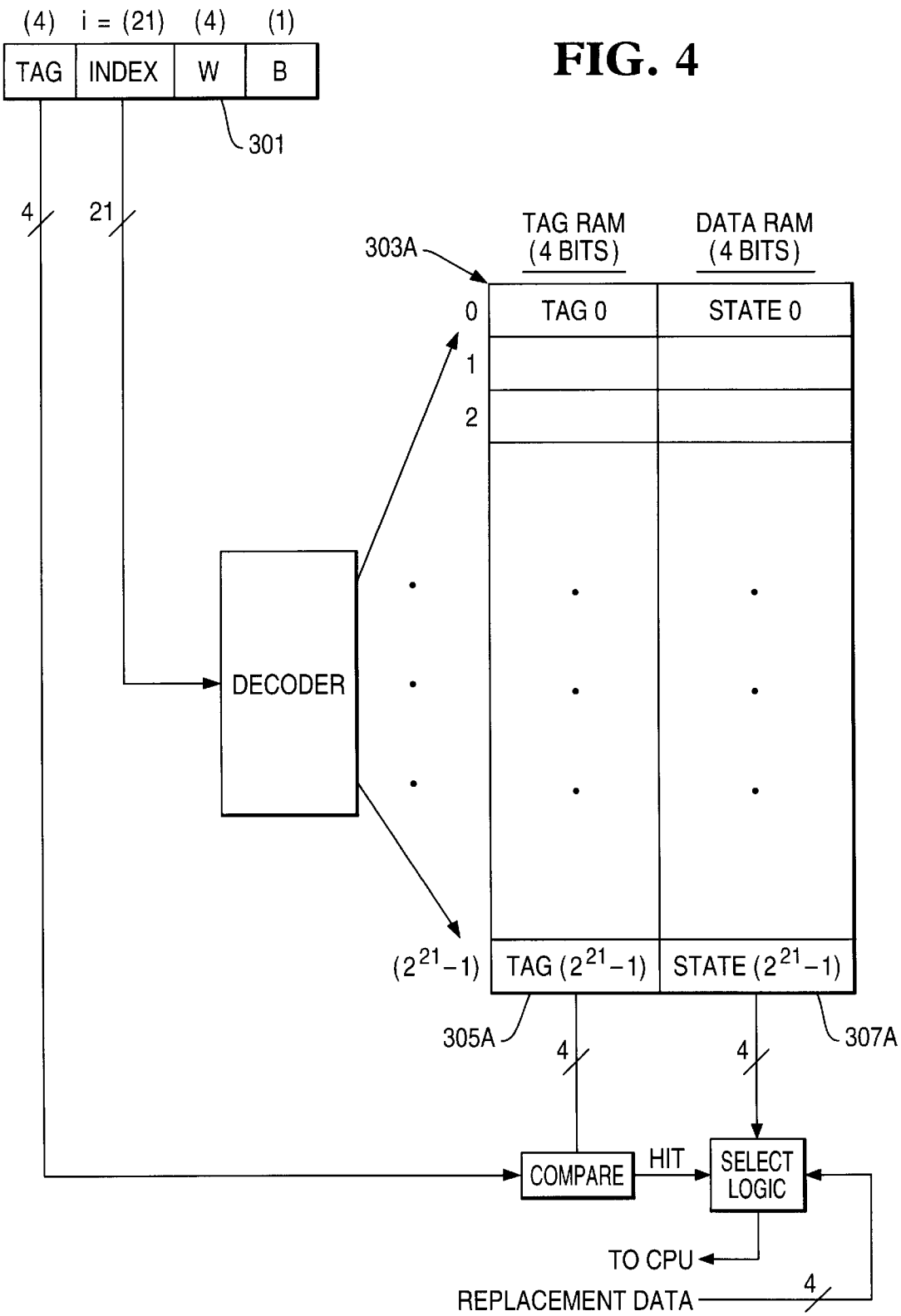
FIG. 4 is a block diagram representation of state cache memory 303 of FIG. 3 providing more detail concerning the structure and operation of state cache 303.

FIG. 3 shows system memory 105A having a size, for example, of one gigabyte ($2^{29}$ bytes) divided into 33,554, 432 ($2^{25}$) million memory blocks or lines, each line having a size of 32 bytes. Data stored within memory 105A is accessed by submitting a 29 bit address 301. The 25 most significant bits within the address, identified as "X" bits, identify the memory block or line number. The next 4 address bits, identified as "W" bits, point to the word within the memory block, while the least significant address bit "B" identifies the byte within a word.

A state cache memory 303A providing for the storage of state information includes two sections identified as the "cache tag RAM" 305A and the "cache data RAM" 307A. Each line entry within state cache memory 303A contains state information saved to the cache data RAM and a four bit tag stored within the cache tag RAM.

Cache memory 303A is indexed by a subset of the total number of memory address bits. The remainder of the address bits, or tag bits, are part of the contents for each entry in the storage device. The index bits define the number of entries in the state cache, and the tag bits determine the number of memory lines which can contend for the same entry in the state cache. The index bits plus the tag bits define the total number of memory lines which can be supported. In essence, the reduction in state storage is defined by the number of tag bits. For example, if the number of tag bits is four, then the state storage requirements for this concept are one sixteenth that of the traditional architecture.

More detailed information concerning the structure and operation of the state cache 303A is shown in FIG. 4. Entries within the state cache are accessed by submitting the same address 301 used to access main memory 105A. The four most significant bits within the address are identified as tag bits, and the next 21 address bits are identified as index bits. These 25 address bits are the same bits identified as X bits in FIG. 3, and which are used to identify memory blocks within main memory 105A.

During a state cache read operation, the index field of the address is used to specify the particular entry or line of cache to be checked. Next, the tag bits of the address are compared with the tag of the selected cache line. If there is a match, a cache hit occurs and the state bits associated with the selected cache line are retrieved.

To store state information within the state cache memory, the index field of an address is used to identify a particular entry or line of cache for tag and state information storage. The first four address bits are saved to the cache tag RAM while the state information associated with the address are saved to the cache data RAM. Optionally, error detection and/or correction syndrome bits or parity bits could be included in the state cache memory.

The state cache, as described, is a direct mapped cache. Note, however, that the state cache can be associative, sectored, or direct mapped as with data caches.

The operation of the memory system is as follows: When a read or write operation is requested of the system memory, the state cache is accessed to determine which coherency cycles are necessary, dependent on the protocol. If the tag information in the state cache match the corresponding bits of the memory address, then the corresponding coherency cycles are performed and the state updated. If there is not a tag match, then coherency operations for the default state are performed (possibly none), and the new line address and state are allocated to the state cache. Possibly an existing entry will be replaced by the new line. Coherency operations may be required to bring the replaced line state to the default state. These replacement coherency operations are the performance cost for reducing the amount of state storage, but as mentioned above are negligible for a reasonable state cache size and typical workload.

The memory space savings provided through use of a state cache memory is illustrated in the following example. Consider the system, described earlier, having one gigabyte of memory and a 4-bit coherency state field required per line of memory. The basic coherency block or line of memory is 32 bytes. To store the 4 bit state for all of memory would require 16 MB of state memory (32 million lines times 4 bits per line). If each entry in the state memory contains a 4 bit tag, the state memory would contain 8 bits of information per line which is double the number of state bits used per line in system memory. However, only one sixteenth as many lines are needed due to the 4 bit tag. Therefore, the total state memory required is 2 MB which is only one eighth of the amount of state memory required in system memory. The trade-off is possible replacements of the state cache entries which are relatively few. In this example, the state cache is equivalent to a 64 MB data cache (2 million entries, each representing 32 byte lines).

FIGS. 3 and 4 illustrate the utilization of a state cache memory 303A with system memory 105A to reduce memory system requirements. A second state cache memory 303B associated with system memory 105B is also provided.

One disadvantage which arises from the above-described process is that additional coherency actions, resulting from replacements of cached state entries, may interfere with normal transfers. However, this interference is negligible for a reasonably-sized state cache for most workloads. Also, if the default state of uncached memory lines is assumed to be shared, replacements most probably will not cause any actions at all since most memory operations are typically to shared rather than owned lines. Additional coherency actions would only occur if an uncached line is accessed for ownership, which would cause an invalidation transaction.

It can thus be seen that there has been provided by the present invention a new and useful directory-based cache coherency memory system for a multiprocessor computer system which reduces memory system requirements by maintaining cache state information within a dedicated cache memory.

Although the presently preferred embodiment of the invention has been described, it will be understood that various changes may be made within the scope of the appended claims.

What is claimed is:

1. A centralized/distributed directory-based cache coherency memory system for a computer system including multiple processors, the memory system comprising:
   a system memory shared by said multiple processors;
   a plurality of data cache memories, at least one data cache memory associated with each one of said processors;
   a processor line status table (PLST) associated with each of said data cache memories, said PLST comprising Modified-Exclusive-Shared-Invalid (MESI) state bits;
   a system of busses interconnecting said system memory with said plurality of data cache memories and said multiple processors; and
   a state cache memory associated with said shared system memory and connected to said system of busses for the storage of a memory line status table (MLST), said MLST to store memory line state information identifying where within said plurality of data cache memories a copy of a line of system memory potentially resides, said memory line state information comprising not cached, shared, and owned state bits, wherein the PLST associated with each of the identified data cache memories indicates local state information for the copy of the line of system memory.

2. The memory system in accordance with claim 1, wherein:
   said state cache memory has a size capable of storing state information for a fraction of the lines of memory contained within said system memory.

3. The memory system in accordance with claim 1, wherein:
   said state cache memory has a size capable of storing state information for one sixteenth of the lines of memory contained within said system memory.

4. The memory system in accordance with claim 1, wherein:
   said state cache memory is a direct mapped cache memory.

5. A multiprocessor computer system comprising:
   a plurality of processors;
   a plurality of data cache memories, at least one data cache memory associated with each one of said processors;
   a processor line status table (PLST) associated with each of said data cache memories said PLST comprising Modified-Exclusive-Shared-Invalid (MESI) state bits;
   a system memory shared by said multiple processors;
   a system of busses interconnecting said system memory with said plurality of data cache memories and said multiple processors; and
   a state cache memory associated with said shared system memory and connected to said system of busses for the storage of a memory line status table (MLST), said MLST to store memory line state information identifying where within said plurality of data cache memories a copy of a line of system memory potentially resides, said memory line state information comprising not cached, share and owned state bits, wherein the PLST associated with each of the identified data cache memories indicates local state information for the copy of the line of system memory.

6. The computer system in accordance with claim 5, wherein:
   said state cache memory has a size capable of storing state information for a fraction of the lines of memory contained within said system memory.

7. The computer system in accordance with claim 5, wherein:
   said state cache memory has a size capable of storing state information for one sixteenth of the lines of memory contained within said system memory.

8. The memory system in accordance with claim 5, wherein:
   said state cache memory is a direct mapped cache memory.

9. A multiprocessor computer system, comprising:
   a plurality of processors;
   a plurality of data cache memories, at least one data cache memory associated with each one of said processors;
   a system memory shared by said multiple processors;
   first and second memory busses connecting said system memory with said plurality of data cache memories and said multiple processors; and
   a centralized/distributed directory-based cache coherency system comprising:
      a Processor Line Status Table (PLST) associated with each data cache memory, each PLST containing state information indicating whether a line of memory within the PLST contains a valid copy of a line of memory within said shared system memory, said PLST comprising Modified-Exclusive-Shared-Invalid (MESI) state bits; and
      a state cache memory associated with said shared system memory and connected to said system of busses for the storage of a memory line status table (MLST), said MLST to store memory line state information identifying one of which data cache memories, if any, potentially contain the valid copy of said line of shared system memory, and which of the first and second memory busses, if any, are connected to data cache memories which potentially contain the valid copy of said line of shared system memory, said memory line state information comprising not cached, shared, and owned state bits.

10. In a computer system including a shared system memory, a plurality of data cache memories, and a system of busses interconnecting said system memory with said plurality of data cache memories, a method for maintaining consistency between data residing in said shared system memory and said plurality of data cache memories, said method comprising the steps of:

provoding a state cache memory connected to said system of busses and a processor line status table (PLST) associated with each of the data cache memories, said state cache memory being associated with said system memory and addressed concurrently with said system memory; and caching a memory line status table (MLST), said MLST to store memory line state information identifying where within said plurality of data cache memories a copy of a line of system memory potentially resides, wherein said PLST associated with each of the identified data cache memories indicates local state information for the copy of the line of system memory, said PLST comprising Modified-Exclusive-Shared-Invalid (MESI) state bits, and said memory line state information comprising not cached, shared and owned state bits.

11. The method in accordance with claim 10, wherein:

said state cache memory has a size capable of storing state information for a fraction of the lines of memory contained within said system memory.

12. The method system in accordance with claim 10, wherein:

said state cache memory has a size capable of storing state information for one sixteenth of the lines of memory contained within said system memory.

13. The method system in accordance with claim 10, wherein:

said state cache memory is a direct mapped cache memory.

\* \* \* \* \*